(12) United States Patent
Park (10) Patent No.: US 9,369,568 B2
(45) Date of Patent: Jun. 14, 2016

(54) MOBILE COMMUNICATION TERMINAL INCLUDING ROTARY KEY AND METHOD OF CONTROLLING OPERATION THEREOF

(71) Applicant: LG Electronics Inc., Seoul (KR)

(72) Inventor: Jun Serk Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/094,184

(22) Filed: Dec. 2, 2013

(65) Prior Publication Data

US 2014/0087791 A1 Mar. 27, 2014

Related U.S. Application Data

(63) Continuation of application No. 11/735,366, filed on Apr. 13, 2007, now Pat. No. 8,600,445.

(30) Foreign Application Priority Data

Jul. 3, 2006 (KR) .................. 10-2006-0062016

(51) Int. Cl.
*H04M 1/00* (2006.01)
*H04B 1/38* (2015.01)
*H04M 1/725* (2006.01)
*G06F 1/16* (2006.01)
(Continued)

(52) U.S. Cl.
CPC .......... *H04M 1/72583* (2013.01); *G06F 1/169* (2013.01); *G06F 1/1626* (2013.01); *G06F 3/0362* (2013.01); *G06F 3/0482* (2013.01); *H04M 1/233* (2013.01); *H04M 1/72586* (2013.01); *H04M 1/236* (2013.01)

(58) Field of Classification Search
CPC ... H04M 1/233; H04M 1/72583; G06F 1/169; G06F 3/0482
USPC ................................ 455/550.1, 566
See application file for complete search history.

(56) References Cited

U.S. PATENT DOCUMENTS 5,761,610 A 6/1998 Sorensen et al.
6,097,964 A 8/2000 Nuovo et al.
(Continued)

FOREIGN PATENT DOCUMENTS

CN 1292898 A 4/2001
CN 1787560 A 6/2006
(Continued)

OTHER PUBLICATIONS

"FOMA D902i", NTT DoCoMo, vol. 1, pp. 26, 27, 360-362, 457, 458, Oct. 2005.
(Continued)

*Primary Examiner* — Ayodeji Ayotunde
(74) *Attorney, Agent, or Firm* — Birch, Stewart, Kolasch & Birch, LLP (57) ABSTRACT

A mobile communication terminal including an input unit configured to generate at least a first signal when selected, a display unit configured to display a plurality of menus related to an operation of the mobile terminal, and a controller configured to display an independent menu on the display unit based on the generated first signal. Further, the independent menu includes at least one menu from the plurality of menus related to the operation of the mobile terminal that is displayed on the display unit independently of an application being executed on the mobile terminal.

29 Claims, 5 Drawing Sheets

(51) Int. Cl.
    *G06F 3/0362*     (2013.01)
    *G06F 3/0482*     (2013.01)
    *H04M 1/23*     (2006.01)

(56) References Cited

U.S. PATENT DOCUMENTS

| | | |
|---|---|---|
| 6,189,018 B1 | 2/2001 | Newman et al. |
| 6,332,024 B1 | 12/2001 | Inoue et al. |
| 7,110,529 B2 | 9/2006 | Kang |
| 7,212,834 B2 | 5/2007 | Hsu et al. |
| 7,321,789 B2 | 1/2008 | Ishihara et al. |
| 7,405,722 B2 | 7/2008 | Takeuchi |
| 7,580,006 B2 | 8/2009 | Takeuchi |
| 2001/0006388 A1 | 7/2001 | Kim et al. |
| 2002/0039915 A1 | 4/2002 | Hama et al. |
| 2002/0067352 A1 | 6/2002 | Takeuchi |
| 2004/0250217 A1 | 12/2004 | Tojo et al. |
| 2005/0009571 A1 | 1/2005 | Chiam et al. |
| 2005/0064862 A1 | 3/2005 | Castrogiovanni et al. |
| 2005/0119031 A1 | 6/2005 | Spalink et al. |
| 2005/0280660 A1 | 12/2005 | Seo et al. |
| 2006/0019717 A1* | 1/2006 | Gong ............................ 455/566 |
| 2006/0035679 A1 | 2/2006 | Han et al. |
| 2006/0128437 A1 | 6/2006 | Kim |
| 2007/0101364 A1 | 5/2007 | Morita |

FOREIGN PATENT DOCUMENTS

| | | |
|---|---|---|
| EP | 0 901 262 A2 | 3/1999 |
| EP | 0 948 028 A2 | 9/1999 |
| JP | 9-251371 A | 9/1997 |
| JP | 2001-331262 A | 11/2001 |
| JP | 2002-140144 A | 5/2002 |
| JP | 2004-62649 A | 2/2004 |
| KR | 10-2001-0020323 A | 3/2001 |
| KR | 10-2006-0012392 A | 2/2006 |
| KR | 10-2006-0014290 A | 2/2006 |
| KR | 10-2006-0030421 A | 4/2006 |
| WO | WO 2005/119419 A1 | 12/2005 |

OTHER PUBLICATIONS

Manual for FOMA® D902i, NTT DoCoMo, Oct. 2005, 500 pages provided.

* cited by examiner

MOBILE COMMUNICATION TERMINAL INCLUDING ROTARY KEY AND METHOD OF CONTROLLING OPERATION THEREOF

CROSS-REFERENCE TO RELATED APPLICATIONS

This application is a continuation of Ser. No. 11/735,366 filed on Apr. 13, 2007 which claims the benefit of Korean Application No. 10-2006-0062016, filed on Jul. 3, 2006 in the Korean Intellectual Property Office, the disclosures of which are incorporated herein by reference.

BACKGROUND OF THE INVENTION

1. Field of the Invention

The present invention relates to a mobile communication terminal, and more particularly to a mobile communication terminal including a rotary key that displays an independent window regardless of an operating status of the terminal when the rotary key is selected.

2. Description of the Related Art

Mobile terminals provide a variety of supplementary service functions in addition to basic call functions. For example, mobile terminals allow a user to send and receive text messages using a Short Message Service (SMS), access the Internet play music or movies, etc. In addition, the many services provided by the mobile terminals are accessed via menu options. Thus, as the supplemental services have increased, the number of menus has also increased resulting in a complicated hierarchical menu structure.

Further, to access a particular function, the user must sequentially select menu options until the desired menu is displayed. For example, if a user wants to view any received text messages, he or she must select a menu button to display a main menu, then select a text messages menu, and then select a review text messages menu. In some terminals, the user can define a shortcut key allowing him or her to execute a particular function when the shortcut key is selected. However, the shortcut key only works when the terminal is an idle mode.

SUMMARY OF THE INVENTION

Accordingly, one object of the present invention is to address the above-noted and other problems.

Another object of the present invention is to provide a mobile terminal with a rotary key that displays an independent menu regardless of an operational state of the mobile terminal when the rotary key is selected.

To achieve these and other advantages and in accordance with the purpose of the present invention, as embodied and broadly described herein, the present invention provides in one aspect a novel a mobile communication terminal including an input unit configured to generate at least a first signal when selected, a display unit configured to display a plurality of menus related to an operation of the mobile terminal, and a controller configured to display an independent menu on the display unit based on the generated first signal. Further, the independent menu includes at least one menu from the plurality of menus related to the operation of the mobile terminal that is displayed on the display unit independently of an application being executed on the mobile terminal.

In another aspect, the present invention provides a method of controlling a mobile communication terminal including generating at least a first signal when an input unit selected, displaying a plurality of menus related to an operation of the mobile terminal, and displaying an independent menu based on the generated first signal. Further, the independent menu includes at least one menu from the plurality of menus related to the operation of the mobile terminal that is displayed on the display unit independently of an application being executed on the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 5(a)-(d) are display screens illustrating a method of operating a rotary key of the mobile terminal according to an embodiment of the present invention.

DETAILED DESCRIPTION OF THE INVENTION

Reference will now be made in detail to the preferred embodiments of the present invention, examples of which are illustrated in the accompanying drawings.

Figure 1:
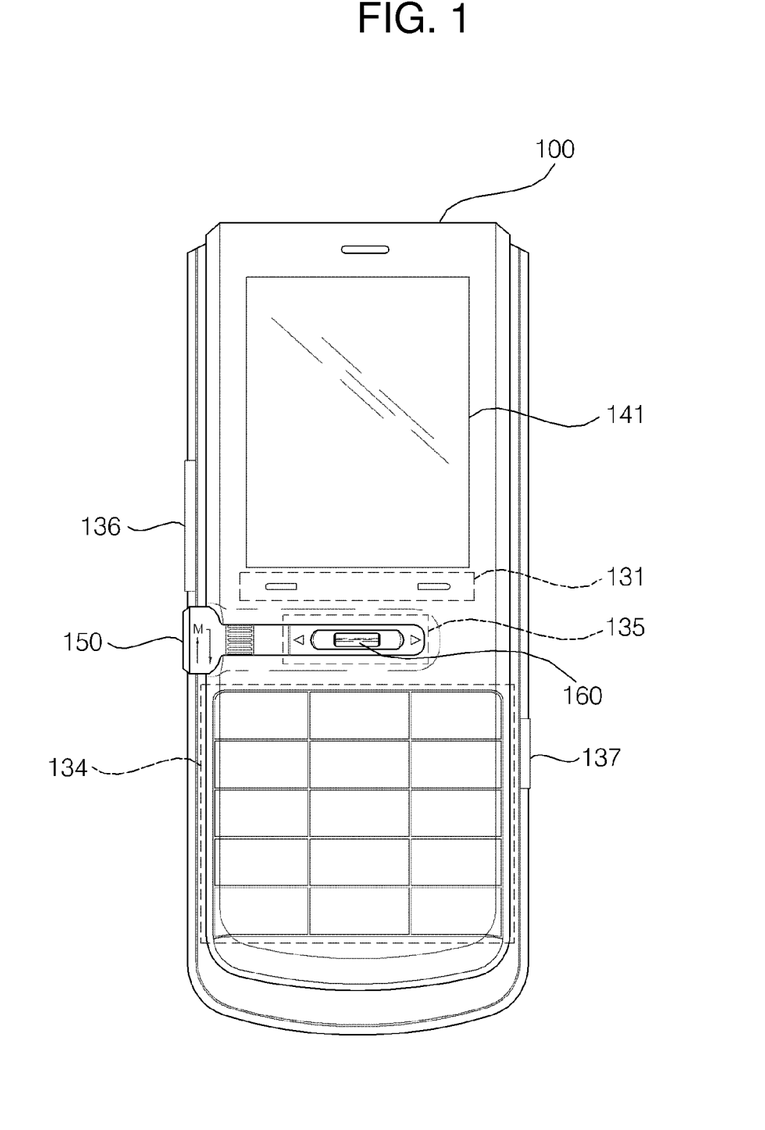
FIGS. 1 and 2 are overviews illustrating a mobile communication terminal according to an embodiment of the present invention.
Figure 2:
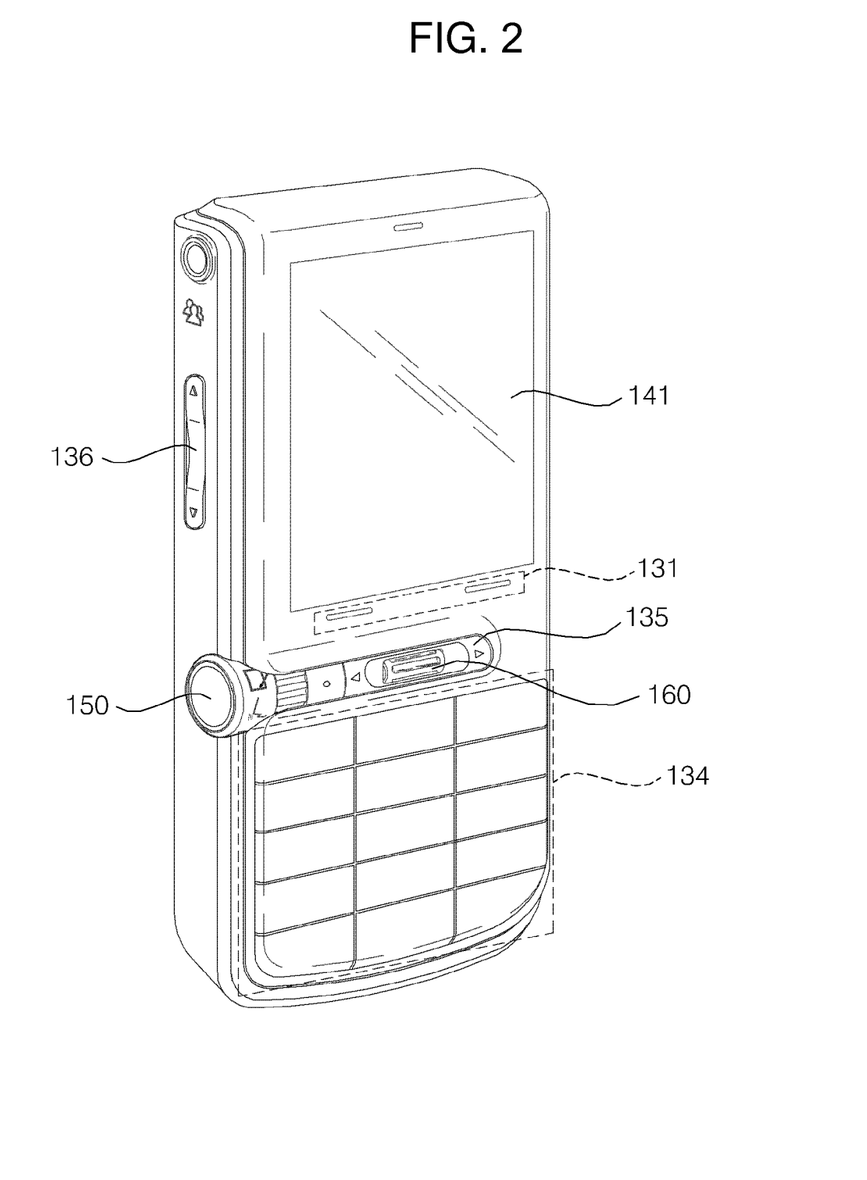

Turning first to FIGS. 1 and 2, which are overviews illustrating a mobile communication terminal 100 according to an embodiment of the present embodiment. As shown, the mobile terminal 100 includes a display window 141 such as a Liquid Crystal Display (LCD), a left and right function key 131, a button key 134 such as a call key, a call end key and a number key, and a navigation key 135. The terminal 100 also includes a volume key 136 for controlling the volume level and a camera hot key 137 for operating a camera function.

Further, the mobile terminal 100 also includes a first rotary key 150 and a second rotary key 160. In one example, the first rotary key 150 can be rotated to scroll through menu options, etc. and the second rotary key 160 that can be rotated and pressed to select a particular item, for example. Thus, the second rotary key 160 is capable of generating a first signal when it is rotated and a second signal when it is pressed. In an alternative example, both of the first and second rotary keys 150 and 160 may be rotated and pressed, thus generating four separate signals.

Figure 3:
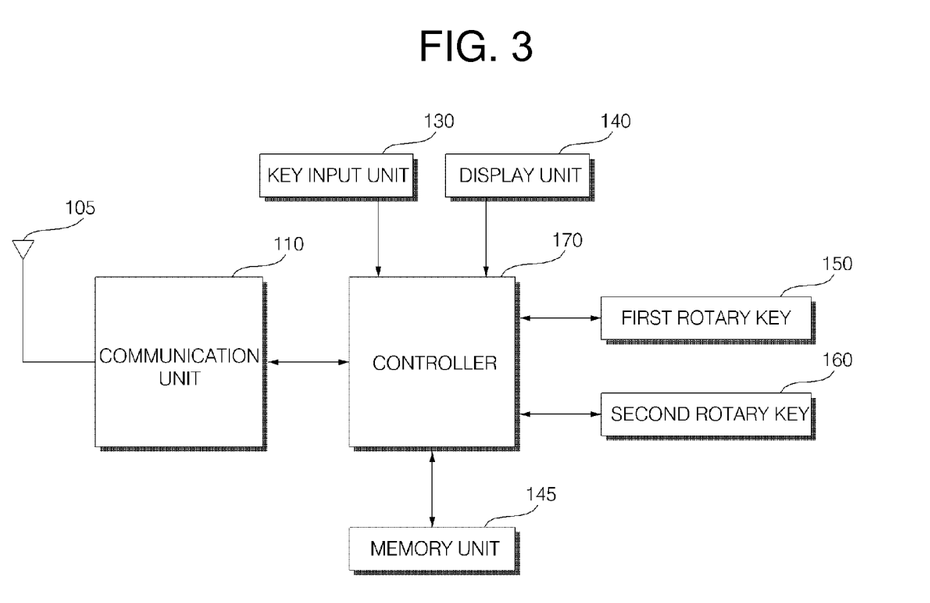
FIG. 3 is a block diagram of a mobile terminal according to an embodiment of the present invention.

Next FIG. 3 is a block diagram of the mobile terminal 100 shown in FIGS. 1 and 2. As shown in FIG. 3, the mobile terminal includes an antenna 105, a communication unit 110, a key input unit 130, a display unit 140, a memory unit 145, the first rotary key 150, the second rotary key 160 and a controller 170. The communication unit 110 provides an interface for wireless communication with a base station through the antenna 105. Further, the communication unit 110 includes a duplex filter for filtering a signal received through the antenna, a power amplifier for amplifying a transmit signal, a frequency up-convert circuit in a transmission path, a frequency down-convert circuit in a reception path, etc.

In addition, the key input unit 130 includes a plurality of keys such as a number key and a function key. The key input unit 130 also sends a signal corresponding to a key pressed by a user to the controller 170. Further, the display unit 140 includes an LCD display window, etc., and displays menus used for operating the mobile terminal and other information such as a state of a received call, battery information, etc. Also, the memory unit 145 stores programs or data used to operate the mobile terminal as well as personal information, etc. entered by the user.

Further, as discussed above, the second rotary key 160 can be rotated and pressed. For example, a rotation of the second rotary key 160 can be detected via a rotary encoder and a pressing of the rotary key 160 can be detected via a pressing detection unit. Thus, the second rotary 160 is capable of generating first and second signals. The rotation of the first rotary key 150 may also be detected via a corresponding rotary encoder. In addition, the controller 170 controls the operation of each the units shown in FIG. 3, and controls the overall operation of the mobile terminal.

Figure 4:
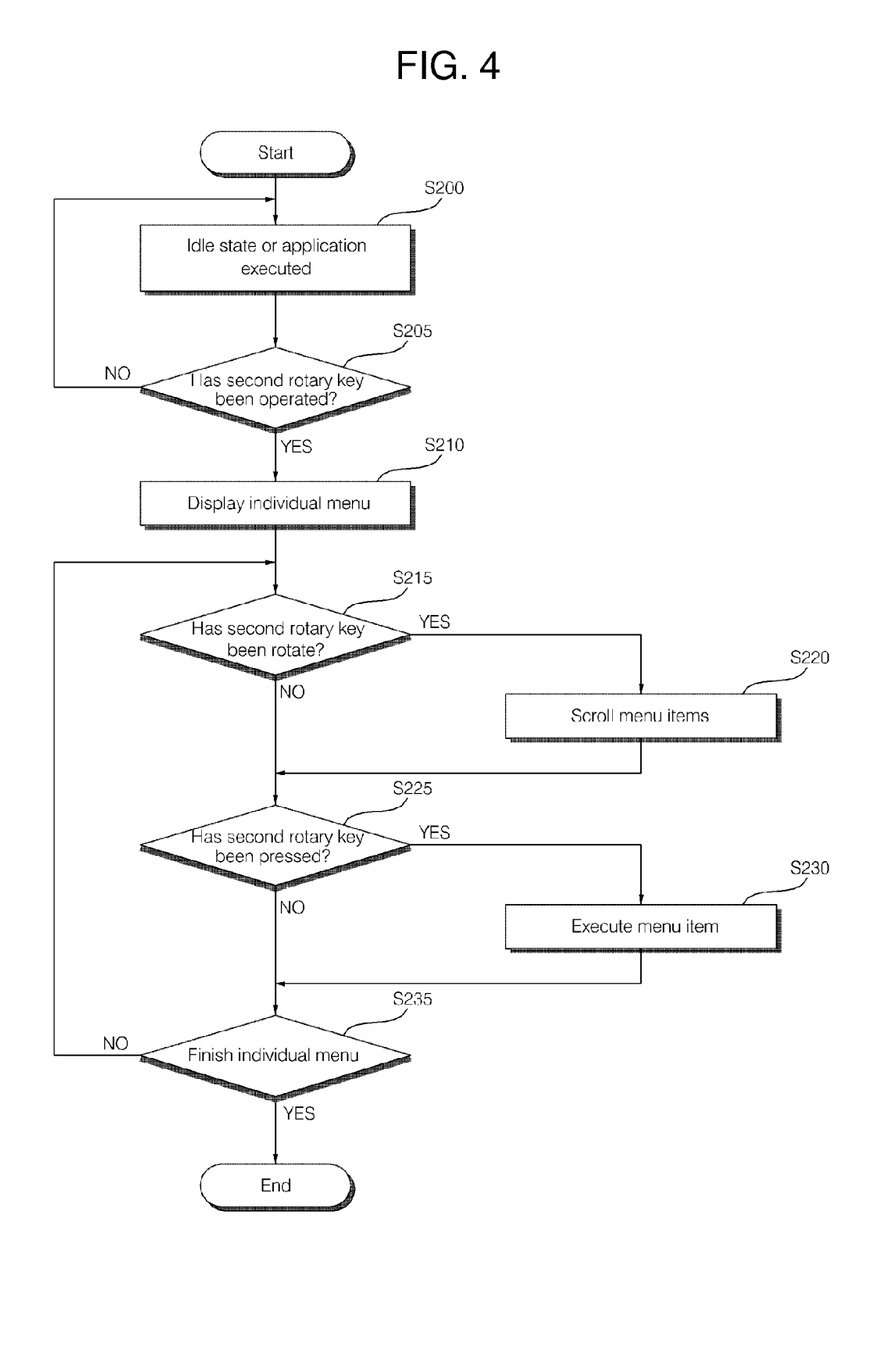
FIG. 4 is a flowchart illustrating a method of controlling a mobile terminal according to an embodiment of the present invention.

Turing next to FIG. 4, which is a flowchart illustrating a method of the present invention. As shown, the mobile terminal is in an idle state or is performing a specific application on the terminal in step S200. Then, the method determines whether or not the first or second rotary keys 150 and 160 have been selected (step S205). For example, the method determines whether or not the first rotary key 150 has been rotated or the second rotary key 160 has been rotated or pressed. If the first or second rotary keys 150 and 160 have been selected (yes in step S205), the controller 170 (FIG. 3) displays an independent menu on the display unit 140 (step S210).

Further, the independent menu includes at least one menu from the plurality of menus related to the operation of the mobile terminal that is displayed on the display unit 140 independently of an application being executed on the mobile terminal 100. The at least one menu included in the independent menu corresponds to an operation frequently performed by a user. For example, if the user frequently checks emails, views a calendar, and checks missed calls, the independent menu would display menus related to checking emails, viewing a calendar and viewing missed calls. In addition, the menus included in the independent menu can be set by the user or can be determined by the controller 170 (i.e., the controller 170 can monitor functions performed by the user over a predetermined amount of time and then appropriately update the independent menu). The menus included in the independent menu can also be preset by a manufacturer of the mobile terminal.

Thus, according to an embodiment of the present invention, the independent menu is displayed on the terminal no matter what operation is performed. For example, the independent menu is displayed when the user is performing a call function, watching a video, listening to an MP3 audio file, etc. The user may also disable this feature by selecting the appropriate menu options. Furthermore, if a storing operation is currently being executed on the mobile terminal, a popup window, for example, may first be displayed indicating the same to the user allowing the user to selectively decide whether be or she wants to finish the storing operation before the independent menu is executed.

Returning to FIG. 4, after the independent menu is displayed, the method determines if the second rotary key 160 has been rotated (step S215). If the second rotary key 160 has been rotated (yes in step S215), the controller 170 scrolls through the different menu options included in the independent menu (step S220). In addition, the method then determines if the second rotary key 160 has been pressed (step S255). If the second rotary key has been pressed (yes in step S225), the controller 170 executes a function corresponding to the highlighted menu option (i.e., the menu option that the cursor is currently on).

Further, the controller 170 scrolls upward and downward through the options in the independent menu when the second rotary key 160 is scrolled upwards and downwards, respectively. Also, when the second rotary key 150 is continuously rotated, the menu options included in the independent menu are continuously looped. In addition, the first rotary key 150 may also be used to rotate through the menu options (and to select an item when the first rotary key 150 also includes the pressing feature).

In addition, even though the first rotary key 150 does not include the pressing feature in this example, the first rotary key may be used to select a highlighted menu option by staying on the highlighted menu option for a predetermined amount of time (e.g., 2 or 3 seconds). That is, the controller 170 counts a time period the menu option is highlighted and executes an application corresponding to the highlighted menu option when the counted time period is greater than a predetermined time period. A similar concept applies to the second rotary key 160. Furthermore, when an application corresponding to a selected menu option is executing, the individual menu may again be displayed by selecting the first rotary key 150.

Next, as shown in FIG. 4, the method determines if the application corresponding to the selected menu option has completed and the user has exited the individual menu feature (step S235). Thus, in accordance with an embodiment of the present invention, the individual menu can be displayed regardless of the operating state of the mobile terminal and a corresponding function may be executed using a single rotary key.

Figure 5:
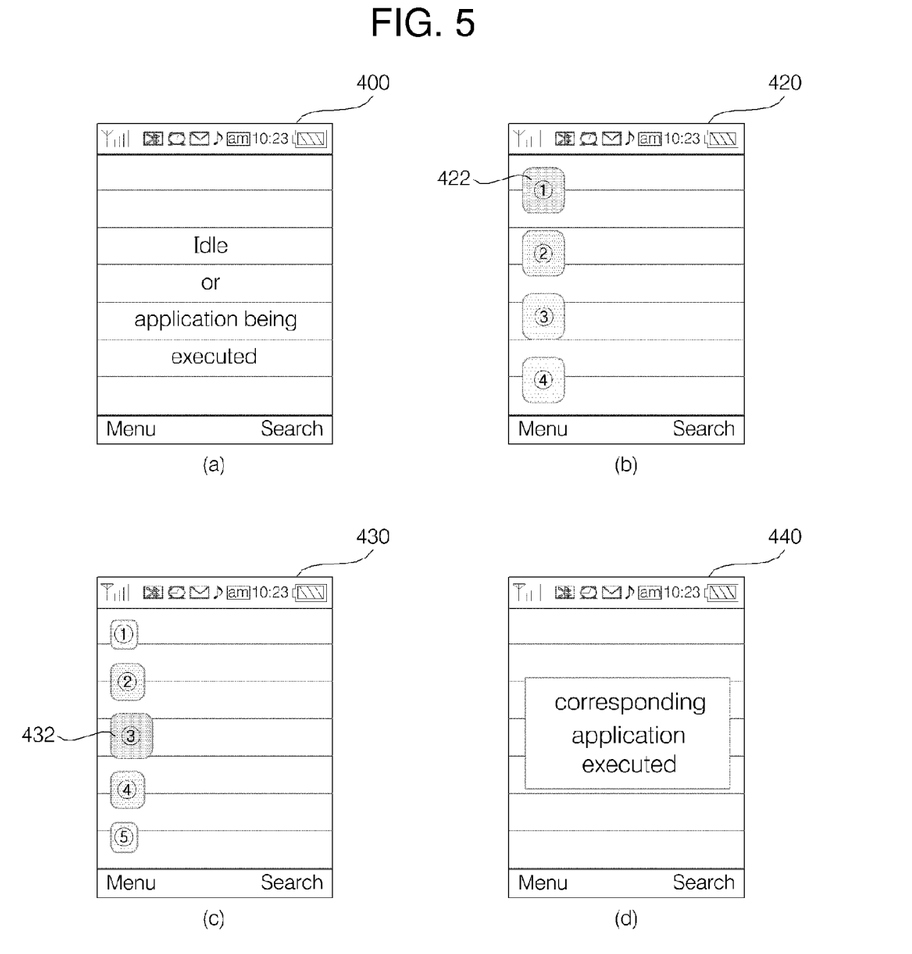

Turning next to FIGS. 5(*a*)-(*d*), which are overviews illustrating different display screens corresponding to the method discussed with respect to FIG. 4. In more detail, FIG. 5(*a*) illustrates a screen 400 displayed on the display unit 140, in which the mobile terminal is in an idle state or is performing a specific application. Then, FIG. 5(*b*) illustrates a screen 420 including the independent menu that is displayed when the second rotary key 160 (or first rotary key 150) is selected.

As shown in FIG. 5(*b*), the independent menu includes four menu options ①, ②, ③ and ④ corresponding to different applications such as email, voice message, etc. In FIG. 5(*b*), the reference numeral 422 indicates a menu option that is currently highlighted. Then, if the user rotates the second rotary key 160, the displayed menu options are scrolled. For example, FIG. 5(*c*) illustrates a screen 430 including the third menu option being highlighted rather than the first menu option in FIG. 5(*b*).

Also, as shown in FIG. 5(*c*), the third menu option is made larger than the other menu options to clearly distinguish the highlighted menu options from the other menu options. Thus, the user is able to easily see the highlighted menu option. FIG. 5(*d*) illustrates a screen 440 including the application being executed corresponding to a selected menu option. As discussed above, a highlighted option may be executed by pressing the second rotary key 160 or by highlighting the menu option for a predetermined amount of time.

As described above, the individual menu including at least one menu option can be displayed on the mobile terminal by operating the rotary key irregardless of the operating state of the terminal. Accordingly, the user can easily access the menu options provided by the mobile terminal. Furthermore, a specific menu option can be selected and executed using a single rotary key. Accordingly, the keys on the terminal can be more efficiently arranged in a limited space.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a display unit configured to display information;
a rotary key configured to receive at least one of a pressed input and a rotated input, the rotary key being located on a side of a main body of the mobile terminal; and
a controller configured to:
control the display unit to display an independent menu in response to a first input signal, the independent menu including a plurality of menu items related to an operation of the mobile terminal, wherein the plurality of menu items are preset by a user of the mobile terminal;
highlight at least one of the plurality of menu items included in the independent menu in response to a second input signal generated by rotating the rotary key; and
execute a function corresponding to the highlighted menu item in response to a third input signal.

2. The mobile terminal of claim 1, wherein at least one menu item included in the independent menu corresponds to an operation frequently performed by the user.

3. The mobile terminal of claim 1, wherein the independent menu is displayed on the display unit regardless of a current operation state of the mobile terminal upon detecting the first input signal.

4. The mobile terminal of claim 1, wherein the menu items included in the independent menu are arranged in a predetermined form.

5. The mobile terminal of claim 1, wherein the menu items included in the independent menu are looped when the rotary key is continuously rotated.

6. The mobile terminal of claim 1, wherein, when the independent menu includes a pointer, the controller is configured to move the pointer to each of the plurality of menu items included in the independent menu in response to the second input signal.

7. The mobile terminal of claim 6, wherein the highlighted menu item corresponds to a menu item indicated by the pointer.

8. The mobile terminal of claim 1, wherein the controller is configured to count a time period being from when a menu item is highlighted, and execute a function corresponding to the highlighted menu when the counted time period is greater than a predetermined time period.

9. The mobile terminal of claim 1, wherein the first input signal is generated by pressing an input unit of the mobile terminal, and the third input signal is generated by touching the display unit.

10. The mobile terminal of claim 1, wherein the controller is configured to control the display unit to redisplay the independent menu when the first input signal is detected while the function corresponding to the highlighted menu item is executed.

11. A method of controlling a mobile terminal, the method comprising:
displaying an independent menu in response to a first input signal, the independent menu including a plurality of menu items related to an operation of the mobile terminal, wherein the plurality of menu items are preset by a user of the mobile terminal;
detecting a second input signal generated by rotating a rotary key, the rotary key configured to receive at least one of a pressed input and a rotated input, wherein the rotary key is located on a side of a main body of the mobile terminal;
highlighting at least one of the plurality of menu items included in the independent menu in response to the detected second input signal; and
executing a function corresponding to the highlighted menu item in response to a third input signal.

12. The method of claim 11, wherein at least one menu item included in the independent menu corresponds to an operation frequently performed by the user.

13. The method of claim 11, wherein the independent menu is displayed on the display unit regardless of a current operation state of the mobile terminal upon detecting the first input signal.

14. The method of claim 11, further comprising arranging the menu items included in the independent menu in a predetermined form.

15. The method of claim 11, further comprising looping the menu items included in the independent menu when the rotary key is continuously rotated.

16. The method of claim 11, wherein, when the independent menu includes a pointer, the method further comprises moving the pointer to each of the plurality of menu items included in the independent menu in response to the second input signal.

17. The method of claim 16, wherein the highlighted menu item corresponds to a menu item indicated by the pointer.

18. The method of claim 11, further comprising:
counting a time period being from when a menu item is highlighted; and
executing a function corresponding to the highlighted menu when the counted time period is greater than a predetermined time period.

19. The method of claim 11, wherein the first input signal is generated by pressing an input unit of the mobile terminal, and the third input signal is generated by touching the display unit.

20. A mobile terminal, comprising:
a display unit configured to display information, the display unit being located on a front side of a main body of the mobile terminal;
an input unit configured to generate an input signal corresponding to a pressed input, the input unit being located on a lateral side of the main body;
a rotary key configured to receive at least one of a pressed input and a rotated input, the rotary key being located next to the input unit on the lateral side of the main body, wherein the rotary key is protruded in a cylindrical shape from the lateral side of the main body and rotated about an axis of rotation perpendicular to a horizontal plane of the lateral side of the main body; and
a controller configured to:
control the display unit to display an independent menu in response to a first input signal, the independent menu including a plurality of menu items related to an operation of the mobile terminal;

highlight at least one of the plurality of menu items included in the independent menu in response to a second input signal generated by rotating the rotary key; and execute a function corresponding to the highlighted menu item in response to a third input signal.

21. The mobile terminal of claim 20, wherein the plurality of menu items is preset by a user of the mobile terminal.

22. The mobile terminal of claim 20, wherein at least one menu item included in the independent menu corresponds to an operation frequently performed by the user.

23. The mobile terminal of claim 20, wherein the independent menu is displayed on the display unit regardless of a current operation state of the mobile terminal upon detecting the first input signal.

24. The mobile terminal of claim 20, wherein the menu items included in the independent menu are arranged in a predetermined form.

25. The mobile terminal of claim 20, wherein the menu items included in the independent menu are looped when the rotary key is continuously rotated.

26. The mobile terminal of claim 20, wherein, when the independent menu includes a pointer, the controller is configured to move the pointer to each of the plurality of menu items included in the independent menu in response to the second input signal.

27. The mobile terminal of claim 26, wherein the highlighted menu item corresponds to a menu item indicated by the pointer.

28. The mobile terminal of claim 20, wherein the first input signal is generated by pressing the input unit of the mobile terminal, and the third input signal is generated by touching the display unit.

29. The mobile terminal of claim 20, wherein the controller is configured to control the display unit to redisplay the independent menu when the first input signal is detected while the function corresponding to the highlighted menu item is executed.

* * * * *